United States Patent
Yin et al.

(10) Patent No.: US 9,153,379 B2
(45) Date of Patent: Oct. 6, 2015

(54) HIGH TEMPERATURE HIGH FREQUENCY MAGNET WIRE AND METHOD OF MAKING

(71) Applicant: GENERAL ELECTRIC COMPANY, Schenectady, NY (US)

(72) Inventors: Weijun Yin, Niskayuna, NY (US); Kevin Warner Flanagan, Troy, NY (US); Robert Colin McTigue, Coeymans Hollow, NY (US); James Jun Xu, Niskayuna, NY (US); Mark Edwin Rodda, Newbury Park, CA (US); Sergei Kniajanski, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/268,260

(22) Filed: May 2, 2014

(65) Prior Publication Data
US 2014/0238554 A1 Aug. 28, 2014

Related U.S. Application Data

(62) Division of application No. 12/968,437, filed on Dec. 15, 2010, now Pat. No. 8,784,993.

(51) Int. Cl.
| | | |
|---|---|---|
| C08K 9/06 | (2006.01) | |
| H01F 41/06 | (2006.01) | |
| H01B 3/00 | (2006.01) | |
| H01B 7/29 | (2006.01) | |
| H01B 3/30 | (2006.01) | |

(52) U.S. Cl.
CPC ............ *H01F 41/0616* (2013.01); *H01B 3/006* (2013.01); *H01B 3/306* (2013.01); *H01B 7/29* (2013.01); *C08K 9/06* (2013.01); *Y10T 428/2995* (2015.01); *Y10T 428/31681* (2015.04)

(58) Field of Classification Search
CPC ................ C08K 9/06; Y10T 428/2995; Y10T 428/31681; H01F 41/0616; H01B 3/10; H01B 3/006; H01B 3/306
USPC ................. 523/212; 428/389, 391; 427/126.4
See application file for complete search history.

(56) References Cited

U.S. PATENT DOCUMENTS

| | | | |
|---|---|---|---|
| 4,546,041 A | | 10/1985 | Keane et al. |
| 4,826,706 A | * | 5/1989 | Hilker et al. ................. 427/120 |
| 6,056,995 A | | 5/2000 | Hake et al. |
| 6,436,537 B1 | * | 8/2002 | Mesaki et al. ............... 428/379 |
| 6,824,827 B2 | | 11/2004 | Katsuki et al. |
| 6,924,024 B2 | | 8/2005 | Narui et al. |
| 7,015,260 B2 | | 3/2006 | Meloni |
| 7,253,357 B2 | | 8/2007 | Cipelli et al. |
| 7,442,727 B2 | | 10/2008 | Meyer et al. |
| 7,763,312 B2 | | 7/2010 | Murray et al. |
| 8,484,831 B2 | * | 7/2013 | Piascik et al. .................. 29/606 |
| 2001/0028954 A1 | * | 10/2001 | Groening et al. ............ 428/389 |
| 2002/0128424 A1 | | 9/2002 | Auman et al. |
| 2009/0326097 A1 | | 12/2009 | Fujita et al. |
| 2010/0193748 A1 | | 8/2010 | Hama et al. |
| 2011/0152426 A1 | | 6/2011 | Cancilleri et al. |
| 2013/0167502 A1 | * | 7/2013 | Wilson et al. ................. 57/210 |

FOREIGN PATENT DOCUMENTS

| | | |
|---|---|---|
| CN | 1798702 A | 7/2006 |
| CN | 101020800 A | 8/2007 |
| CN | 101735716 A | 6/2010 |
| CN | 101789654 A | 7/2010 |
| CN | 101812183 A | 8/2010 |

OTHER PUBLICATIONS

Unofficial English Translation of Chinese Office Action issued in connection with corresponding CN Application No. 201110437714.5 on Apr. 21, 2015.

* cited by examiner

*Primary Examiner* — Margaret Moore
(74) *Attorney, Agent, or Firm* — John P. Darling

(57) ABSTRACT

A method of making a composite magnet wire includes mixing alumina nano particles with a polyimide polymer to form a polyimide mixture, the alumina nano particles having a surface treatment applied to outer surfaces of the alumina nano particles, the surface treatment including a phenyl-silane; coating a wire with the polyimide mixture by passing the wire through a coating die; heating the coated wire; cooling the coated wire; passing the coated wire through an annealing oven at a temperature of about 425° C. to about 475° C. at a speed of about 15 to about 30 feet per minute to anneal the coated wire; cooling the annealed coating wire; spooling the coated wire onto a metal spool; heating the spooled wire at about 300° C. to about 400° C. for about 20 to about 40 minutes; and cooling the heated spooled wire.

12 Claims, 3 Drawing Sheets

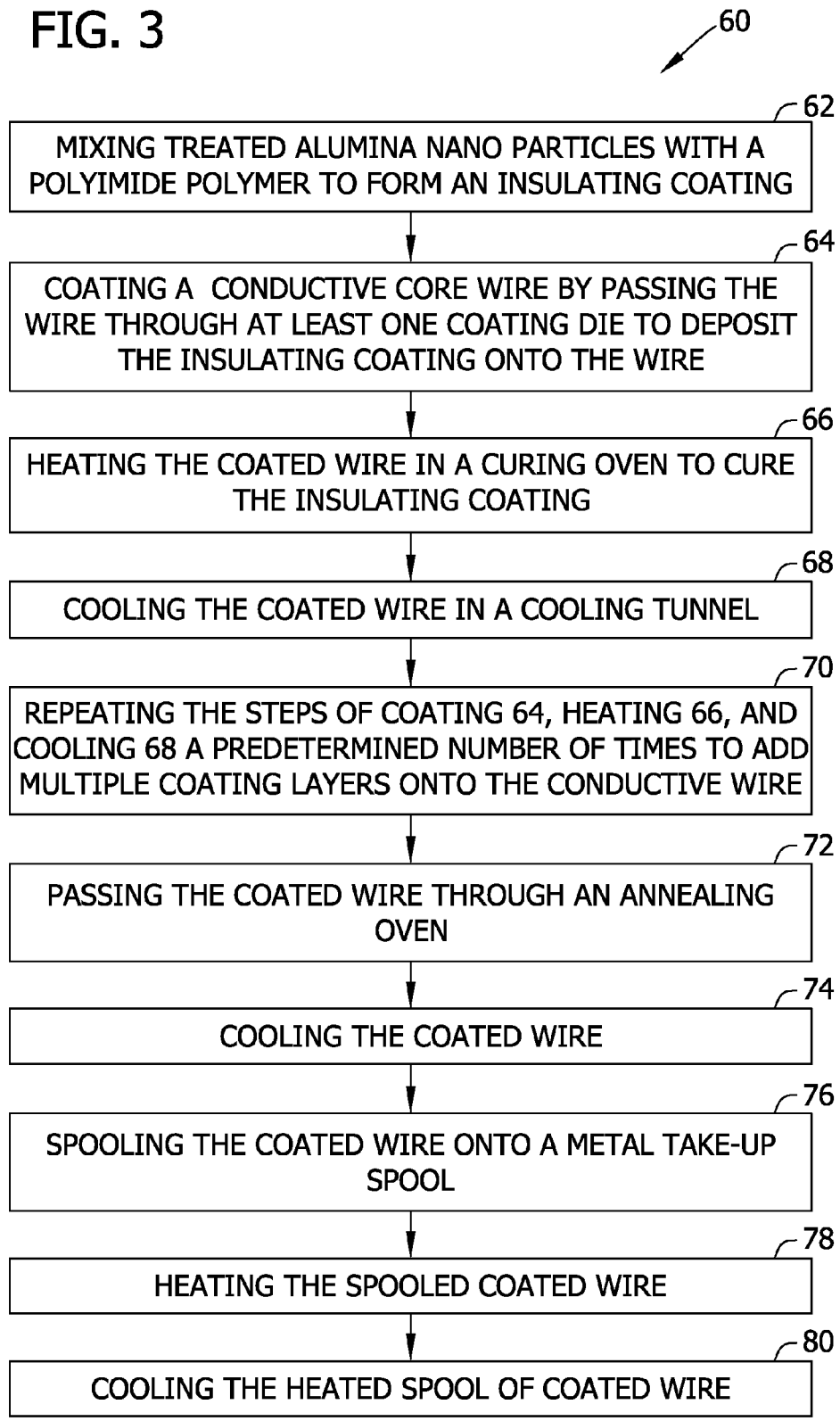

HIGH TEMPERATURE HIGH FREQUENCY MAGNET WIRE AND METHOD OF MAKING

CROSS REFERENCE TO RELATED APPLICATION

This application is a divisional of U.S. application Ser. No. 12/968,437, filed Dec. 15, 2010, now U.S. Pat. No. 8,784,993, issued Jul. 22, 2014.

BACKGROUND OF THE INVENTION

The field of the invention relates generally to high temperature high frequency magnet wire, and more particularly to a composite magnet wire coated with a coating that includes alumina nano particles dispersed in a polyimide polymer.

Coated electrical conductors typically include one or more electrical insulation layers, also referred to as wire enamel compositions, formed around a conductive core. Magnet wire is one form of coated electrical conductor in which the conductive core is a copper wire or copper alloy, and the insulation layer or layers include dielectric materials, such as polymeric resins, coated peripherally around the conductor. Magnet wire is used in the electromagnet windings of transformers, electric motors, and the like. Because of its use in such windings, the insulation system of magnet wire must be sufficiently flexible such that the insulation does not delaminate or crack or otherwise suffer damage during winding operations. The insulation system must also be sufficiently abrasion resistant so that the outer surface of the system can survive the friction, scraping and abrading forces that can be encountered during winding operations. The insulation system also must be sufficiently durable and resistive to degradation so that dielectric properties are maintained over a long period of time.

In addition, magnet wire also is used in the construction of transformers, inductors, motors, headphones, loudspeakers, hard drive head positioners, potentiometers, and electromagnets, among other applications. Magnet wire is the primary insulation used in electric machines, motors, generators and transformers as winding insulation. The magnet wire carries alternating current and generates a magnetic field and induced electric power. Magnet wire typically uses multiple layers of polymer insulation to provide a tough, continuous insulating layer. Magnet wire insulating coatings may be, in order of increasing temperature range, polyurethane, polyamide, polyester, polyester-polyimide, polyamide-polyimide, and polyimide. Polyimide insulated magnet wire is capable of operation at up to 250° C.

BRIEF DESCRIPTION OF THE INVENTION

In one aspect, a composite magnet wire is provided. The composite magnet wire includes a metal wire and a coating applied to an outer surface of the wire. The coating includes a polyimide polymer and a plurality of alumina nano particles dispersed in the polyimide polymer. The alumina nano particles have a surface treatment applied to outer surfaces of the alumina nano particles, where the surface treatment includes a phenyl-silane. The composite magnet wire has a thermal degradation temperature index of at least 300° C. as calculated in accordance with ASTM E1641.

In another aspect, a method of making a composite magnet includes mixing alumina nano particles with a polyimide polymer to form a polyimide mixture. The alumina nano particles have a surface treatment applied to outer surfaces of the alumina nano particles. The surface treatment includes a phenyl-silane. The method also includes coating a wire with the polyimide mixture by passing the wire through a coating die, heating the coated wire, cooling the coated wire, and repeating the steps of coating, heating, and cooling to deposit a predetermined number of coating layers on the wire. The method further includes passing the coated wire through an annealer having a temperature of about 425° C. to about 475° C. at a speed of about 15 to about 30 feet per minute, spooling the multilayered coated wire onto a metal spool, heating the spooled wire at about 300° C. to about 400° C. for about 20 to about 40 minutes, and cooling the heated spooled wire.

BRIEF DESCRIPTION OF THE DRAWINGS

FIG. 3 is a flow chart of a method of making the composite magnet wire shown in FIG. 1.

DETAILED DESCRIPTION OF THE INVENTION

A composite magnet wire and a method of making the magnet wire are described below in detail. The composite magnet wire may be used in electric machines, for example, motors, generators, transformers, inductors, and the like. A polyimide coating is applied to the magnet wire for insulation properties. Alumina nano particles are dispersed in the polyimide coating. Alumina is also known as aluminum oxide ($Al_2O_3$). The alumina nano particles include a surface treatment applied to the outer surface of the alumina nano particles. The surface treatment passivates the surface of the alumina nano particles thereby making the surface nonreactive. Surface passivity prevents the particles from agglomerating and settling in the polyimide coating. The coated magnet wire exhibits unique properties. For example, the coated magnet wire exhibits higher thermal capability, as compared to known magnet wire, which enables electric machines to be made with higher power density and to run at a higher temperature environment than known electric machine temperature environments. Specifically, the coated magnet wire has a thermal degradation temperature index of at least 300° C. as calculated in accordance with ASTM E1641. In contrast, the highest thermal degradation temperature index of known magnet wire is about 240° C. A thermal degradation temperature index of at least about 300° C. permits higher power density in electric machines and permit operation in higher temperature environments. In addition, the magnet wire exhibits better pulse surge resistance than typically provided in known electric machines which permits increased reliability of inverter driven motors, generators and other electric machines.

Figure 1:
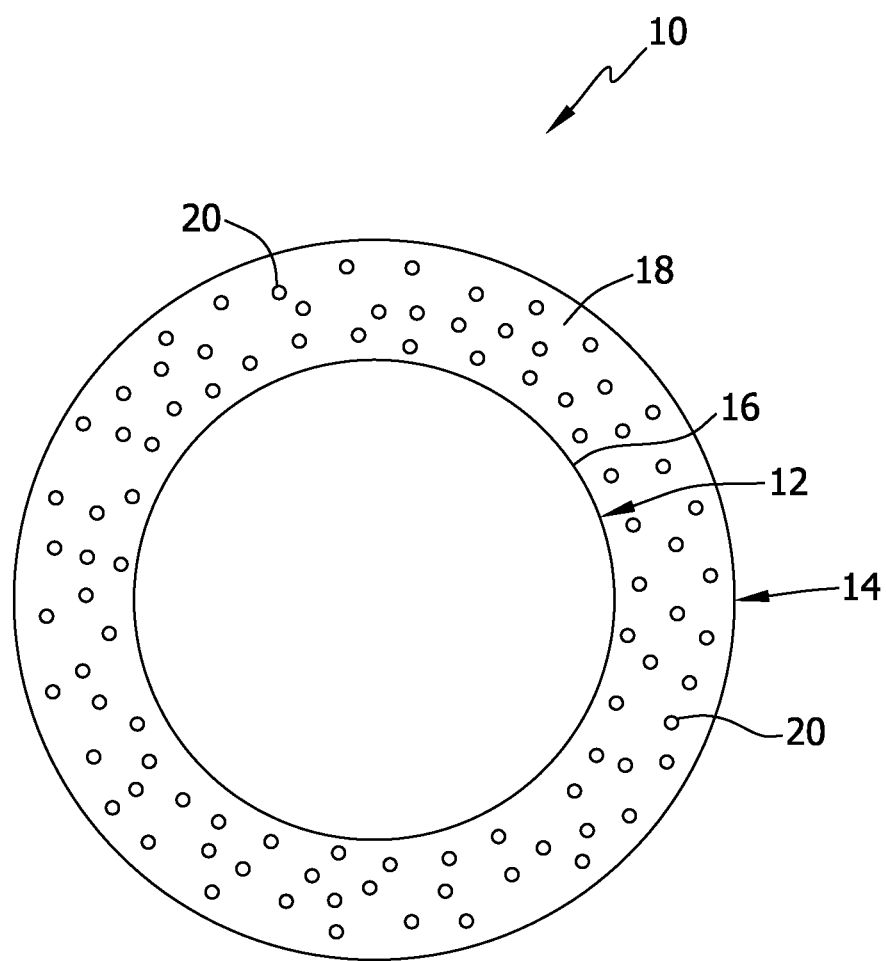
FIG. 1 is an enlarged schematic sectional end view of an exemplary magnet wire.

Referring to the drawings, FIG. 1 is a sectional end view schematic of an exemplary composite magnet wire 10 that includes a conductive core 12 and an insulating coating 14 applied to an outer surface 16 of conductive core 12. Conductive core 12 is generally a metal wire, for example, a copper wire, a copper alloy wire, a silver plated copper wire, a nickel plated or nickel cladded copper wire, an aluminum wire, a copper clad aluminum wire, and the like.

Coating 14 includes a polyimide polymer 18 and a plurality of alumina nano particles 20. Suitable polyimide polymers that may be used include, but not limited to, poly(pyromellitic dianhydride-co-4,4'-oxydianiline), amic acid; poly(biphenyltetracarboxylic dianhydride-co-phenylenediamine), amic acid; and mixtures thereof. Poly(pyromellitic dianhydrideco-4,4'-oxydianiline), amic acid is commercially available from Industrial Summit Technology Co., Parlin, N.J., under the trade name of RC5019 Pyre-ML, and poly(biphenyltetracarboxylic dianhydride-co-phenylenediamine), auric acid is commercially available from UBE America, New York, N.Y., under the trade name of UBE-Varnish-S.

Alumina nano particles 20 have an average particle size less than 100 nanometers (nm). In another embodiment, alumina nano particles have an average particle size of about 20 nm to about 50 nm. The amount of alumina nano particles 20 in coating 14 is about 1% to about 10% by weight in one embodiment, and about 1% to about 6% by weight in another embodiment. The weight percent is based on the total weight of coating 14.

Alumina nano particles 20 have a surface treatment applied to the outer surface of the nano particles. The surface treatment includes a phenyl-silane. Suitable phenyl-silanes that may be used include, but not limited to, trimethoxyphenylsilane, triethoxyphenylsilane, and mixtures thereof. To apply the surface treatment to nano particles 20, the particles are suspended in a solvent mixture of anhydrous toluene and an anhydrous alcohol, for example, isopropanol. In one embodiment, the solvent mixture includes a ratio of about 10:1 anhydrous toluene to an anhydrous alcohol. In another embodiment, the solvent mixture includes a ratio of about 10:1 anhydrous toluene to anhydrous isopropanol. The nano particle suspension may be mixed with, for an example, a horn sonicator, or any other mixing apparatus. The nano particle suspension is refluxed, in one embodiment, for about 2 to about 4 hours, and in another embodiment, for about 3 hours. The refluxed suspension is cooled to ambient temperature and then filtered to remove the treated nano particles from the solvent mixture. The treated nano particles are then suspended in a polar solvent that is compatible with a polyimide. In another embodiment, the refluxed cooled suspension is mixed with a polar solvent that is compatible with a polyimide and has a boiling point higher than the solvents used for making said suspension. Low boiling solvents are then removed under reduced pressure affording a suspension of the treated nano particles in a polar solvent. Suitable polar solvents include, but are not limited to, N-methyl-2-pyrrolidone (NMP). The suspension of treated nano particles in the polar solvent is thoroughly mixed with any suitable mixing equipment, for example, ultrasonic apparatuses and high energy mixers, such as, Cowles mixers.

Coating 14 is made by mixing the suspension of treated alumina nano particles 20 with polyimide polymer 18. Any suitable mixing equipment may be used for mixing the suspension of treated alumina nano particles with the polyimide polymer, for example, high energy mixers and ultra sonic apparatuses, such as, horn sonicators.

Figure 2:
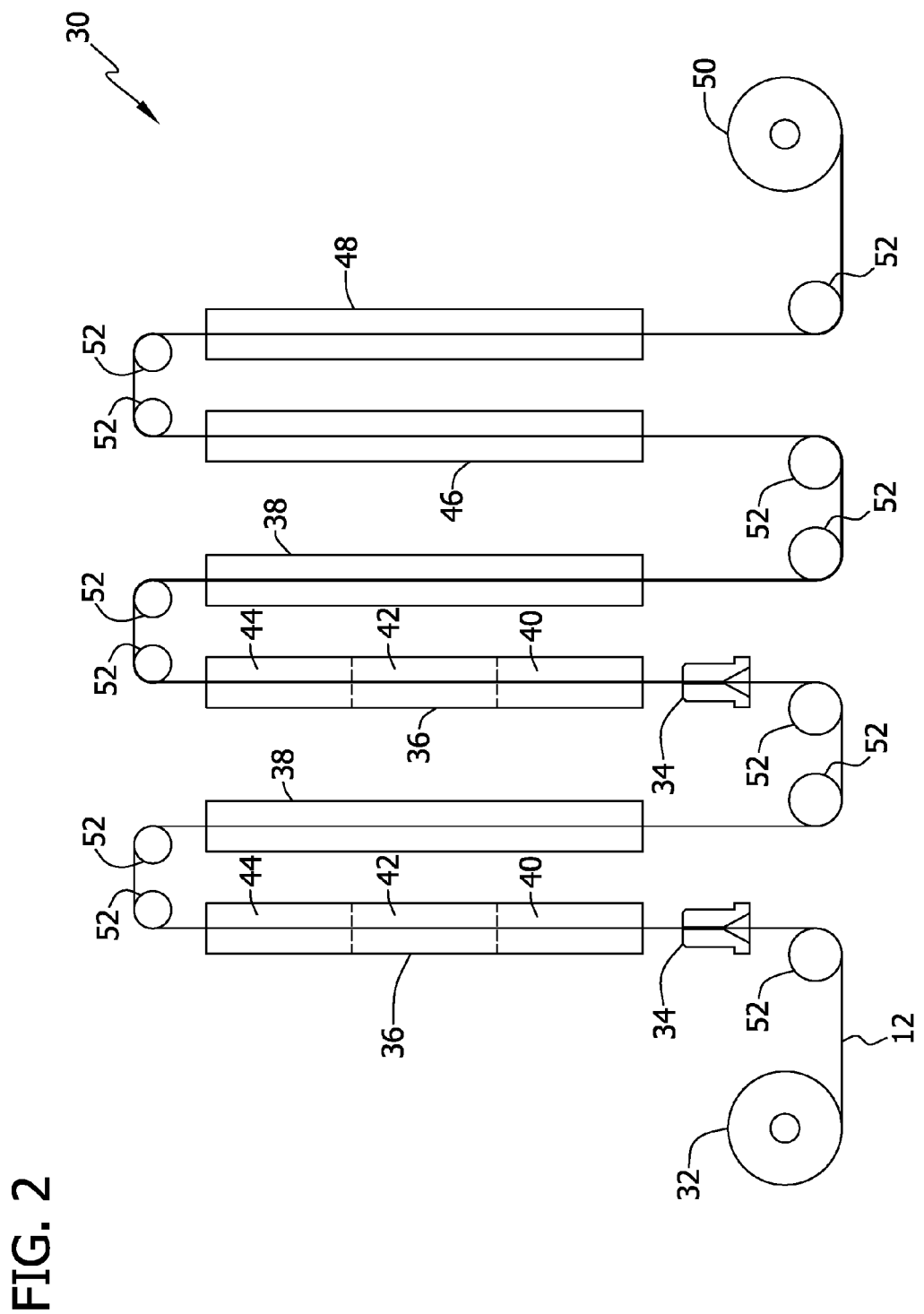
FIG. 2 is a schematic of a magnet wire manufacturing system.

FIG. 2 is a schematic of a magnet wire manufacturing system 30 that includes a feed spool 32 that contains uncoated conductive core wire 12 wound onto feed spool 32, and at least one coating die 34 (two shown). System 30 also includes at least one curing oven 36 (two shown) and at least one cooling tunnel 38 (two shown). Each curing oven 36 has a plurality of heat zones 40, 42, and 44 (three shown) for a graduated temperature curing cycle. In other embodiments curing ovens 36 may have more or less than the three zones shown in FIG. 2. In addition, system 30 also includes an annealing oven 46 with an annealing cooling tunnel 48, and a take-up spool 50. A plurality of guide rollers 52 are used to guide conductive wire 12 through coating dies 34, curing ovens 36, cooling tunnels 38, annealing oven 46, and annealing cooling tunnel 48, and onto take-up spool 50. In another embodiment, system 30 includes only one cure oven 36, one cooling tunnel 38, and a plurality of coating dies 34. Coated wire 12 passes through a first coating die 34 and then into and through curing oven 36, then wire 12 passes through cooling tunnel 38 and then through a second coating die 34. Coated wire 12 then passes back through curing oven 36 and cooling tunnel 38. Coated wire 12 passes through the remainder of coating dies 34 with passes through curing oven 36 and cooling tunnel 38 between passes through subsequent coating dies 34.

FIG. 3 is a flow chart of a method 60 of making composite magnet wire 10. Method 60, in an exemplary embodiment, includes mixing 62 treated alumina nano particles 20 with polyimide polymer 14 to form an insulating coating 14; coating 64 conductive core wire 12 by passing wire 12 through at least one coating die 34 to deposit insulating coating 14 onto wire 12; heating 66 coated wire 12 in curing oven 36 to cure insulating coating 14; and cooling 68 coated wire 12 in cooling tunnel 38. In one embodiment, the temperature of curing oven is about 350° C. to about 450° C., and in another embodiment, about 380° C. to about 410° C. Curing oven may have multiple zones 40, 42, and 44 with each successive zone having a higher temperature. In one embodiment, curing oven has three zones were first zone 40 has a temperature of about 350° C. to about 400° C., second zone 42 has a temperature of about 380° C. to about 420° C., and third zone 44 has a temperature of about 400° C. to about 450° C. In another embodiment, first zone 40, second zone 42, and third zone 44 have a temperature of about 380° C., 400° C., and 410° C. respectively. Curing oven 36 is not limited to three zones, and may have less than three zones or greater than three zones. Method 60 also includes repeating 70 the steps of coating 64, heating 66, and cooling 68 a predetermined number of times to add multiple coating layers onto conductive wire 12. Multiple coating layers increases the thickness of insulating coating 14 to a predetermined thickness. In one embodiment, insulating coating 14 has a thickness of about 38 micrometers (μm) to about 76 μm, and in another embodiment, about 45 μm to about 60 μm. Method 60 further includes passing 72 coated wire 12 through an annealing oven having a temperature of about 425° C. to about 475° C. at a speed of about 15 to about 30 feet per minute; cooling 74 coated wire 12; spooling 76 coated wire 12 onto a metal take-up spool 50; heating 78 spooled coated wire 12 at about 300° C. to about 400° C. for about 20 to about 40 minutes; and cooling 80 the heated spool of coated wire 12 which results in composite magnet wire 10.

The following examples are presented for the purpose of illustration only and are not intended to limit the scope of the claims.

EXAMPLE I

An insulating coating containing surface treated alumina nano particles and a polyimide was prepared and then coated onto a conductive wire to create a magnet wire in accordance with an exemplary embodiment.

Treated alumina was prepared by suspending 20 g of 45 nm alumina in a mixture of 200 milliliters (ml) of anhydrous toluene and 40 ml of anhydrous isopropanol in a flask. Next, 3 ml of phenyltrimethoxysilane was added, and the suspension was sonicated with a horn sonicator using a repetitive cycle of 20 seconds on and 4 seconds off for 10 minutes at 66 W output of the sonicator. The flask containing the suspension was immersed into an ice bath during the sonication. The resulted suspension was refluxed for 3 hours and was then allowed to cool down to room temperature. The resulted suspension was filtered through 10 ml sintered glass, first by gravity, then using a vacuum. The filtration funnel was capped with a rubber diaphragm to prevent moisture access to the material. After 20 hours of filtration, 19.6 grams of treated alumina remained on the filter.

A solution of treated alumina and a solvent was prepared by adding 4 g of the treated alumina into a glass vial containing 40 ml of N-methyl-2-pyrolidone (NMP). The vial was capped, and was placed in a sonicator water bath (42 kHz and 155 W) for sonication for 3-5 hrs. A homogenous stable milky solution was formed.

To prepare the insulating coating, a 20% UBE-V-S solution (poly(biphenyltetracarboxylic dianhydride-co-phenylenediamine), amic acid, commercially available from UBE America Co.) was diluted to 10% solids with NMP. Then 18 g of 45 nm treated alumina particles was added to NMP and mixed for 15 minutes with a horn sonicator. Next 30 g of UBE-V-S solution at 10% solids was added to the alumina and NMP solution. The components were mixed for 30 minutes with a horn sonicator to form the insulating coating in accordance with the exemplary embodiment.

The insulating coating was applied to a conductive wire (22 gauge oxygen-free high conductivity (OFHC) soft bare copper) by passing the conductive wire through coating dies. There were 12 passes of the conductive wire through the coating dies to apply successive layers of the insulating coating, and four dry passes through the dies. The die used in the first pass had a diameter of 0.27 inch, the dies used for the next three passes had a diameter of 0.26 inch, the dies used for the next four passes had a diameter of 0.27 inch, and the dies used for the remaining of passes had a diameter of 0.28 inch. Between each pass through the dies the coated wire was heated in an oven having three zones at temperatures of 300° C. in the first zone, 380° C. in the second zone, and 400° C. in the third zone, and then cooled. Next the coated wire was passed through an annealing oven at a temperature of 450° C. at 15 feet per minute, and then cooled. The annealed coated wire was spooled on to a metal spool, heated at 350° C. for 30 minutes, and then was permitted to cool to room temperature.

EXAMPLE II (COMPARATIVE)

A comparison magnet wire was prepared by coating a conductive wire with a polyimide insulating coating that did not contain alumina particles.

An insulating coating was prepared by diluting RC5019 Pyre-ML solution (poly(pyromellitic dianhydride-co-4,4'-oxydianiline, amic acid solution, commercially available from Industrial Summit Technology Co.) to 10% solids with NMP.

The insulating coating was applied to a conductive wire, 22 gauge OFHC soft bare copper, by passing the conductive wire through coating dies. There were 16 passes of the conductive wire through the coating dies to apply successive layers of the insulating coating. The dies used in the first four passes had a diameter of 0.26 inch, the dies used for the next four passes had a diameter of 0.27 inch, the dies used for the next four passes had a diameter of 0.28 inch, the dies used for the next four passes had a diameter of 0.29 inch, and the dies used for the remaining of passes had a diameter of 0.28 inch. Between each pass through the dies the coated wire was heated in an oven having three zones at temperatures of 280° C. in the first zone, 340° C. in the second zone, and 360° C. in the third zone, and then cooled. Next the coated wire was passed through an annealing oven at a temperature of 450° C. at 15 feet per minute, and then cooled.

EXAMPLE III

Thermal endurance tests of sample twisted pairs of the magnet wire of Example I and sample twisted pairs the comparison magnet wire of Example II were performed. The samples were twisted automatically in accordance to NEMA standard for 22 gauge round conductor with 12 full turns and 6 pounds of tension.

Thermal gravimetric analysis (TGA) was used to determine the 95% weight loss temperature of the samples. The higher the 95% weight loss temperature the better the thermal properties of the sample. The analysis was carried out by raising the temperature of the sample gradually and plotting weight (percentage) against temperature. Table 1 shows the 95% weight loss temperature of the Samples 1 and 2 of Example I and the comparison Samples 3, 4, and 5 of Example II. Samples 1 and 2 had a significantly higher 95% weight loss temperature than the 95% weight loss temperature of Samples 3, 4, and 5.

TABLE 1

| Sample | 95% Weight Loss Temperature (° C.) |
|---|---|
| Sample 1 (Example I) | 626 |
| Sample 2 (Example I) | 620 |
| Sample 3 (Example II) | 565 |
| Sample 4 (Example II) | 555 |
| Sample 5 (Example II) | 562 |

EXAMPLE IV

The thermal class of the insulating coatings described in Examples I and comparison Example II were also determined by TGA testing. Each insulating coating was cast with a 254 μm blade moving at 5 mm per second. Sample 6 is a film of the insulating coating described in Example I, and Sample 7 is a film of the insulating coating described in Example II. As shown in Table 2, the insulating coating of Sample 6 that included surface treated alumina nano particles had a degradation temperature index of 307° C., while the comparison coating of Sample 7 only had a degradation temperature index of 240° C.

TABLE 2

| Samples | 95% Weight Loss Temperature (° C.) | Energy (kJ/mol)* | Degradation Temperature Index (° C.), 20,000 hours** |
|---|---|---|---|
| Sample 6 | 569.3 | 192.6 | 307 |
| Sample 7 | 492.3 | 146.1 | 240 |

*Calculation based on ASTM E1641.
**Calculation based on ASTM E1641 and ASTM E1877.

EXAMPLE V

Sample twisted wires described in Example III were subjected to thermal aging for a period of time at a temperature of 320° C. and 340° C. according to ASTM D237 (2005). Sample A included ten twisted wires coated with the insulating coating described in Example I, and Sample B included ten twisted wires coated with the insulating coating described in comparison Example II. Sample A was heat aged at 340° C. and Sample B was heat aged at 315° C. Each twisted wires was examined every seven days by passing 665 volts through the pair to determine if the twisted pair was functioning. Table 3 shows the results of the thermal aging tests. Specifically, all of the wires in Sample A were still functional after 31 days of heat aging. In comparison, all the wires of Sample B failed after only 7 days of heat aging at 320° C., which was 20° C. lower than the aging temperature of Sample A.

TABLE 3

| Sample   | Days Aged | Temperature °C. | Number of Wires Passed | Number of Wires Failed |
|----------|-----------|-----------------|------------------------|------------------------|
| Sample A | 9         | 340             | 10                     | 0                      |
| Sample A | 17        | 340             | 10                     | 0                      |
| Sample A | 24        | 340             | 10                     | 0                      |
| Sample A | 31        | 340             | 10                     | 0                      |
| Sample B | 7         | 320             | 0                      | 10                     |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of making a composite magnet wire, comprising:
    mixing alumina nano particles with a polyimide polymer to form a polyimide mixture, the alumina nano particles having a surface treatment applied to outer surfaces of the alumina nano particles, the surface treatment comprising a phenyl-silane;
    coating a wire with the polyimide mixture by passing the wire through a coating die;
    heating the coated wire;
    cooling the coated wire;
    passing the coated wire through an annealing oven at a temperature of about 425° C. to about 475° C. at a speed of about 15 to about 30 feet per minute to anneal the coated wire;
    cooling the annealed coating wire;
    spooling the coated wire onto a metal spool;
    heating the spooled wire at about 300° C. to about 400° C. for about 20 to about 40 minutes; and
    cooling the heated spooled wire.

2. The method in accordance with claim 1, wherein heating the coated wire comprises heating the coated wire at a temperature of about 380° C. to about 410° C.

3. The method in accordance with claim 1, wherein mixing the alumina nano particles with the polyimide polymer comprises mixing about 1% to about 6% by weight alumina nano particles with the polyimide polymer.

4. The method in accordance with claim 1, wherein the surface treatment comprises at least one of trimethoxyphenylsilane and triethoxyphenylsilane.

5. The method in accordance with claim 1, wherein the polyimide polymer is formed from at least one of poly(pyromellitic dianhydride-co-4,4'-oxydianiline) amic acid and poly(biphenyltetracarboxylic dianhydride-co-phenylenediamine) amic acid.

6. The method in accordance with claim 1, further comprising repeating the coating, heating, and cooling to deposit a predetermined number of layers on the wire, wherein a thickness of the layers on the outer surface is about 25 µm to about 50 µm.

7. The method in accordance with claim 1, wherein the alumina nano particles have an average particle size less than about 100 nm.

8. The method in accordance with claim 1, wherein the alumina nano particles have an average particle size of about 20 nm to about 50 nm.

9. The method in accordance with claim 1, wherein the mixing comprises:
    preparing a dispersion of the surface treated alumina nano particles in a solvent; and mixing the surface treated alumina nano particle dispersion with the polyimide polymer.

10. The method in accordance with claim 9, further comprising:
    forming a suspension by adding a plurality of alumina nano particles to a mixture of toluene and isopropanol;
    adding a phenyl-silane to the suspension;
    mixing the components to form the suspension;
    refluxing the suspension;
    filtering the refluxed suspension to separate the treated alumina nano particles from the suspension;
    adding the treated alumina nano particles to the solvent; and
    mixing the nano particles and the solvent to form a dispersion of nano particles in the solvent.

11. The method in accordance with claim 9, wherein the solvent comprises N-methylpyrrolidone.

12. The method in accordance with claim 1, wherein the composite magnet wire has a thermal degradation temperature index of at least 300° C. as calculated in accordance with ASTM E1641 or ASTM D2307 (2005).

* * * * *